United States Patent [19]

Miller

[11] Patent Number: 5,980,680
[45] Date of Patent: Nov. 9, 1999

[54] METHOD OF FORMING AN INSULATION PRODUCT

[75] Inventor: William Scott Miller, Newark, Ohio

[73] Assignee: Owens Corning Fiberglas Technology, Inc., Summit, Ill.

[21] Appl. No.: 09/032,093

[22] Filed: Feb. 27, 1998

Related U.S. Application Data

[63] Continuation of application No. 08/618,874, Mar. 20, 1996, abandoned, which is a continuation-in-part of application No. 08/310,183, Sep. 21, 1994, Pat. No. 5,885,390, and a continuation-in-part of application No. 08/609,071, Feb. 29, 1996, abandoned.

[51] Int. Cl.$^6$ ....................................................... B29B 1/65
[52] U.S. Cl. .................... 156/242; 156/244.11; 156/245; 156/324
[58] Field of Search .............................. 156/242, 244.11, 156/245, 324

[56] References Cited

U.S. PATENT DOCUMENTS

| | | |
|---|---|---|
| 1,828,217 | 10/1931 | Barker, Jr. . |
| 1,943,258 | 1/1934 | Harshberger . |
| 2,197,562 | 4/1940 | Keinker . |
| 2,209,850 | 7/1940 | Shand et al. . |
| 2,230,272 | 2/1941 | Slayter . |
| 2,313,630 | 3/1943 | Dockerty . |
| 2,333,218 | 11/1943 | Pazsiczky . |
| 2,344,601 | 3/1944 | Collins . |
| 2,411,326 | 11/1946 | McMillin et al. . |
| 2,571,334 | 10/1951 | Browne . |
| 2,602,967 | 7/1952 | Wise . |
| 2,693,668 | 11/1954 | Slayter . |
| 2,722,718 | 11/1955 | Siu . |
| 2,824,610 | 2/1958 | Schubert et al. . |
| 2,871,911 | 2/1959 | Goldsworthy et al. . |
| 2,927,621 | 3/1960 | Slayter et al. . |
| 2,931,076 | 4/1960 | Clark . |
| 2,940,134 | 6/1960 | Heritage . |
| 2,990,004 | 6/1961 | Sowers et al. . |
| 2,998,620 | 9/1961 | Stalego . |
| 3,073,005 | 1/1963 | Tiede . |
| 3,107,057 | 10/1963 | Hanusch . |
| 3,149,944 | 9/1964 | Leaman . |
| 3,161,920 | 12/1964 | Stalego . |
| 3,249,307 | 5/1966 | Peeps et al. . |
| 3,301,930 | 1/1967 | Boggs . |
| 3,328,142 | 6/1967 | LeJecque . |
| 3,338,777 | 8/1967 | Irwin et al. . |
| 3,556,888 | 1/1971 | Goldsworthy . |
| 3,653,861 | 4/1972 | Stalego et al. . |
| 3,659,790 | 5/1972 | Gelin . |
| 3,670,348 | 6/1972 | Irwin . |
| 3,791,806 | 2/1974 | Koizumi et al. . |
| 3,824,086 | 7/1974 | Perry et al. . |

(List continued on next page.)

FOREIGN PATENT DOCUMENTS

| | | |
|---|---|---|
| 0190011 | 8/1986 | European Pat. Off. . |
| 0196194 | 10/1986 | European Pat. Off. . |
| 0367661 | 5/1990 | European Pat. Off. . |
| 2141853 | 3/1973 | Germany . |
| 1100430 | 1/1968 | United Kingdom . |
| 9512553 | 5/1995 | WIPO . |

OTHER PUBLICATIONS

Derwent World Pat. 1994 Derwent Publ. Ltd Japan 74020924.
Paul Fibers From Polymer Blends (1978) pp. 192–201.

*Primary Examiner*—Richard Weisberger
*Attorney, Agent, or Firm*—Inger H. Eckert

[57] ABSTRACT

A method for forming an insulation product includes centrifuging irregular glass fibers using a rotary process, collecting the fibers as a pack, continuously withdrawing a portion of the fibers from the pack to generate a continuous yarn of fibers, and pneumatically propelling the yarn toward a receptacle, such as an insulation cavity, to form an insulation product. Also, a strand of continuous, irregular textile fibers can be payed out from a wound package and pneumatically propelled toward a receptacle, such as an insulation cavity, to form an insulation product.

20 Claims, 10 Drawing Sheets

U.S. PATENT DOCUMENTS

| | | |
|---|---|---|
| 3,850,601 | 11/1974 | Stapleford . |
| 3,865,540 | 2/1975 | Loeffler . |
| 3,881,903 | 5/1975 | Stalego . |
| 3,895,896 | 7/1975 | White et al. . |
| 3,900,302 | 8/1975 | Langlois et al. . |
| 3,966,533 | 6/1976 | Goldsworthy et al. . |
| 3,981,708 | 9/1976 | Loefler et al. . |
| 3,999,971 | 12/1976 | Drummond . |
| 4,145,199 | 3/1979 | Russell . |
| 4,162,190 | 7/1979 | Ashworth . |
| 4,167,404 | 9/1979 | Loeffler . |
| 4,168,959 | 9/1979 | Loeffler . |
| 4,184,643 | 1/1980 | McCort . |
| 4,197,228 | 4/1980 | Lin et al. . |
| 4,201,247 | 5/1980 | Shannon . |
| 4,203,774 | 5/1980 | Battigelli et al. . |
| 4,296,164 | 10/1981 | Bemis et al. . |
| 4,347,985 | 9/1982 | Simpson . |
| 4,358,502 | 11/1982 | Dunbar . |
| 4,366,927 | 1/1983 | Kielmeyer . |
| 4,373,005 | 2/1983 | Goodwin . |
| 4,381,330 | 4/1983 | Gotomyo et al. . |
| 4,387,180 | 6/1983 | Jen et al. . |
| 4,396,722 | 8/1983 | Rapp . |
| 4,463,048 | 7/1984 | Dickson et al. . |
| 4,478,624 | 10/1984 | Battigelli et al. . |
| 4,486,211 | 12/1984 | Monaghan . |
| 4,541,884 | 9/1985 | Cogswell et al. . |
| 4,542,044 | 9/1985 | Gano et al. . |
| 4,543,690 | 10/1985 | Potter . |
| 4,555,447 | 11/1985 | Sielott et al. . |
| 4,674,271 | 6/1987 | Bird . |
| 4,682,523 | 7/1987 | Johnson et al. . |
| 4,707,399 | 11/1987 | Kambosek . |
| 4,744,810 | 5/1988 | Battigelli et al. . |
| 4,756,957 | 7/1988 | Kielmeyer . |
| 4,829,738 | 5/1989 | Moss . |
| 4,842,667 | 6/1989 | Thorsted, Jr. . |
| 4,842,928 | 6/1989 | Kielmeyer . |
| 4,853,021 | 8/1989 | Soszka et al. . |
| 4,863,502 | 9/1989 | Schlachter . |
| 4,909,817 | 3/1990 | Gill et al. . |
| 4,983,453 | 1/1991 | Beall . |
| 5,001,005 | 3/1991 | Bianpied . |
| 5,011,523 | 4/1991 | Roncato et al. . |
| 5,035,936 | 7/1991 | Dockrill et al. . |
| 5,042,111 | 8/1991 | Iyer et al. . |
| 5,042,122 | 8/1991 | Iyer et al. . |
| 5,051,123 | 9/1991 | Nurmi . |
| 5,055,428 | 10/1991 | Porter . |
| 5,071,793 | 12/1991 | Jean et al. . |
| 5,075,353 | 12/1991 | Hoshimoto et al. . |
| 5,102,690 | 4/1992 | Iyer et al. . |
| 5,102,728 | 4/1992 | Gay et al. . |
| 5,112,678 | 5/1992 | Gay et al. . |
| 5,134,959 | 8/1992 | Woodmansee et al. . |
| 5,143,582 | 9/1992 | Arkens et al. . |
| 5,155,964 | 10/1992 | Fortin et al. . |
| 5,164,342 | 11/1992 | Muralidhar et al. . |
| 5,190,217 | 3/1993 | Black et al. . |
| 5,219,656 | 6/1993 | Klett et al. . |
| 5,236,743 | 8/1993 | Bates et al. . |
| 5,268,015 | 12/1993 | Furtak et al. . |
| 5,316,561 | 5/1994 | Roncato . |
| 5,328,493 | 7/1994 | Roncato . |
| 5,367,849 | 11/1994 | Bullock . |
| 5,431,992 | 7/1995 | Houpt et al. . |

METHOD OF FORMING AN INSULATION PRODUCT

RELATED APPLICATION

This application is a continuation of U.S. application Ser. No. 08/618,874 filed on Mar. 20, 1996, now abandoned, which is a Continuation-in-Part of commonly assigned, copending U.S. patent application Ser. No. 08/310,183 filed Sep. 21, 1994 (Alkire et al.), allowed, now U.S. Pat. No. 5,885,390 and entitled PROCESSING METHODS AND PRODUCTS FOR IRREGULARLY SHAPED BICOMPONENT GLASS FIBERS, and of U.S. patent application, Ser. No. 08/609,071, now abandoned, filed Feb. 29, 1996, entitled METHOD OF FORMING AN IMPREGNATED FIBROUS MATERIAL, both of which are assigned to the assignee of the present application.

TECHNICAL FIELD

The present invention relates to the processing of glass fiber wool and products therefrom, and more particularly, to methods for processing and products made from irregularly shaped glass fibers.

BACKGROUND ART

Conventional glass fibers are useful in a variety of applications including reinforcements, textiles, and acoustical and thermal insulation materials.

Continuous glass fibers are typically produced via bushings for reinforcement and textile applications. Such fibers are typically made of many glass filaments held together by sizing. The glass fibers are often further processed by combining them into continuous strands, yarns and rovings, or by chopping the glass fibers into preselected lengths defined by the end user. Where chopped, the resulting short, straight fiber segments may be mixed with other materials, wet processed into mats such as are used for shingles, or otherwise treated for use. While bushings have significant operational lifetimes, their throughput is limited relative to rotary fiberizing techniques for producing glass fibers.

Short, straight fibers typical of acoustic and thermal insulation materials are made by rotary fiberizing techniques and are interconnected by binders. In such techniques, molten glass is delivered from a furnace to an orificed centrifuge, commonly referred to as a spinner. Fibers produced by the spinner are drawn downward by a blower. A binder, which is required to bond the fibers into a wool product, is sprayed onto the fibers as they are drawn downward. The fibers are then collected and formed into a wool pack. The resulting materials suffer from non-uniform material distribution, the expense of binder, and costs to treat effluent and exhaust air to protect the environment from the impact of organic compounds in the binder.

In addition to insulation materials, other wool products are produced from the wool pack by further compressing and heat setting the wool into boards or panels. Alternately, the wool may be blended with other natural and synthetic fibers to form non-woven materials, and thereafter carded or combed to open up the fiber pack for further processing, such as needling. Carding and combing tends to align the fibers. The blended fibers serve both to open the glass fiber matrix and make the glass fibers amenable to needling by 'lubricating' the needling action.

Conventional glass fibers, whether continuous, chopped, or in wool packs have found their way into a wide variety of products. It is desirable to further improve the characteristics of products including glass fibers, and to find new uses for glass fibers which take advantage of glass fiber properties.

DISCLOSURE OF THE INVENTION

In accordance with the present invention an irregularly shaped glass fiber is provided which enjoys improved resiliency, and openness in pack structures. Packs, batts or other assemblies, generally referred to herein as portions, include irregularly shaped glass fibers which are entangled and require no binder. As set forth in accordance with the present invention, portions of the wool pack having irregularly shaped fibers may be processed directly without intervening steps which are required in conventional glass fiber processing operations. That is, a wool pack of the irregularly shaped glass fibers may be needled without the precursor steps of carding, blending with other fibers, or lubricating, otherwise required with conventional straight glass wools. The openness and resiliency of the irregularly shaped glass fibers further allows the wool fibers to resist abrasion and needling damage by deflection rather than breakage, producing less dust during processing. Nonetheless, the open structure of the irregularly shaped glass fibers improves the ease with which carding and blending operations are performed, when such are desired. Further, irregularly shaped glass fibers produced in accordance with the present invention have a more uniform weight distribution, so that non-woven materials produced by needling or other processing exhibit more uniform properties. As a result, a series of articles including irregularly shaped fibers may be produced at lower cost, or processed with less effort, with varied and improved performance characteristics.

Accordingly, the present invention provides a method for producing non-woven material from irregularly shaped glass fibers including the steps of providing a portion of irregularly shaped glass fiber wool, needling the irregularly shaped glass fiber wool, and thereby producing a non-woven material substantially comprised of irregularly shaped glass fibers. Preferably, the method is performed with irregularly shaped, bi-component glass fibers produced by rotary fiberization, and requires no precursor processing such as carding or blending.

The present invention, thus, provides for a non-woven material comprised of an uncarded, needled glass fiber wool including irregularly shaped glass fibers, preferably bi-component glass fibers unblended with other fibers. Materials including needled, irregularly shaped glass fibers in accordance with the present invention demonstrate not only the high temperature, smoke and chemical resistance of glass, and dimensional stability, but also a resiliency, high loft, resistance to tear, and soft felt-like feel (i.e. soft "hand"). The choice of needles, repetitive needling, needling from one or both sides, and location of needling can vary these characteristics, making numerous product applications possible.

By way of example and not limitation, product applications of the resulting woven and non-woven materials include use of irregularly shaped glass fiber materials in filtration elements, sorbants, gaskets, packings, shingles, composite structural elements, furnishings, textiles, yarns, and blown-in insulation systems.

Finally, in a further aspect of the present invention, a non-woven material is provided including irregularly shaped fibers in a generally continuous wool tow. The generally continuous tow is produced by "unwinding" a fiberglass wool pack collected by a direct forming method. In the direct forming method, irregularly shaped glass fibers are collected such that a generally spiral fiber relationship in the veil of fibers is captured and then generally maintained in the wool pack. This generally continuous wool tow may be further processed in numerous ways to form yarns, textiles, packings, reinforcements, and blown-in insulation.

A still further feature of the continuous tow is that the generally continuous tow may be transported between operating stations through tubes blown or drawn by air movement induced by fans or vacuum.

The production of a generally continuous tow by "unwinding" a fiberglass wool pack collected by a direct forming method may further be applied in a portable blowing wool system comprising a wool pack of irregularly shaped glass fibers collected by direct form methods, which may be unwound and cubed on site, and blown into spaces to be insulated.

In another embodiment of the invention, an insulation product is formed by providing irregular fibers as a pack, continuously withdrawing a portion of the fibers from the pack to generate a continuous yarn of fibers, and propelling the yarn toward a receptacle to form an insulation product. The receptacle can be any substrate for receiving the fibers, or anything containing a cavity which requires insulation. The yarn can be propelled by running it through a pneumatic nozzle, and can be chopped as it is propelled through the nozzle. The fibers can be produced using a rotary process or can be provided as a strand wound on a package, with the strand produced from a textile bushing. The insulation product formed by this method can be formed in numerous applications, such as in a cavity in a building or in a cavity in an appliance.

BEST MODE FOR CARRYING OUT THE INVENTION

The methods of the present invention may be used to process wool packs of irregularly shaped long glass fibers into further products and materials as representatively shown in FIGS. 1 through 12.

Figure 1:
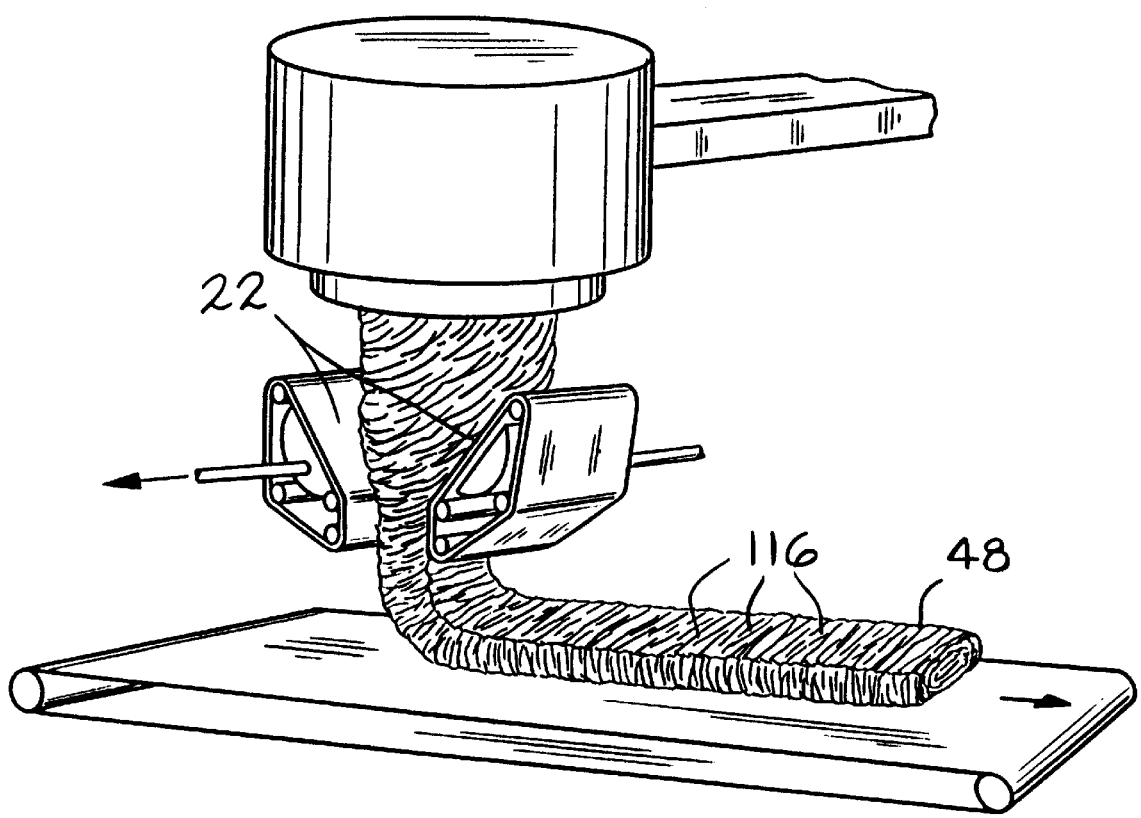
FIG. 1 is a schematic perspective view of a direct forming method of collecting irregularly shaped glass fibers in accordance with the present invention.
Figure 2:
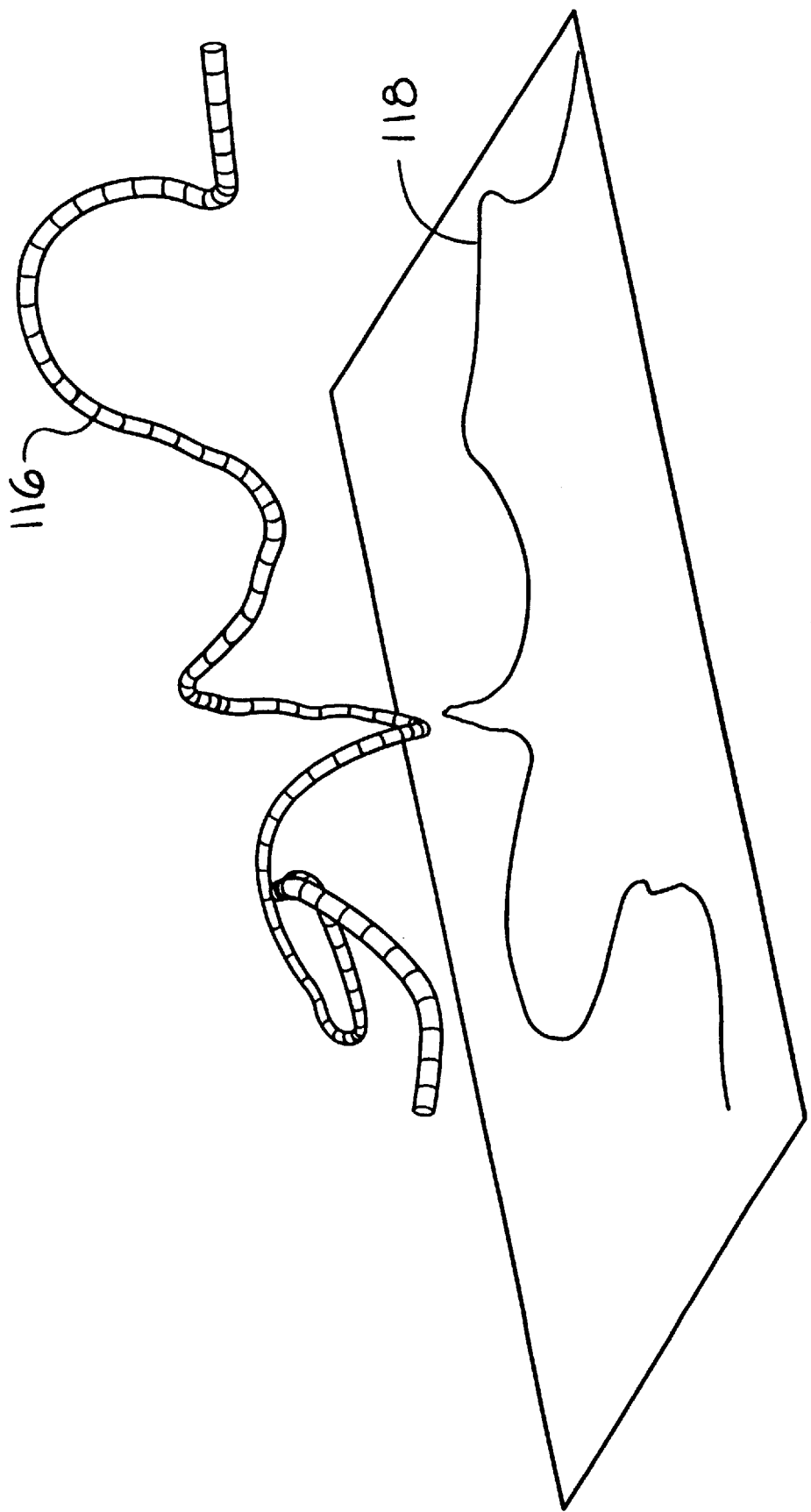
FIG. 2 is a schematic perspective view of an irregularly shaped glass fiber in accordance with the present invention.

Referring to FIG. 1, irregularly shaped glass fibers 116 are provided which enjoy improved resiliency, and openness in pack structures 48. Packs, batts or other assemblies, generally referred to herein as portions 148, include irregularly shaped glass fibers 116 which are entangled, and require no binder. The fiber structure and methods of manufacturing wool packs 48 are set forth in commonly assigned U.S. Pat. No. 5,431,992 and commonly assigned and copending U.S. patent application Ser. Nos. 08/240,428, filed May 10, 1994; 081236,061, filed May 2, 1994; and 08/236,067 filed May 2, 1994, all of which are incorporated by reference herein in their entirety.

Referring to FIG. 1, the preferred process for producing a wool pack 48 (or portion 148) is shown in which long, irregularly shaped glass fibers 116 are collected upon opposing first conveyor surfaces 22. Referred to also as a direct form collection, the preferred process is best disclosed in greater detail in U.S. patent application Ser. No. 08/240,428, previously incorporated by reference. This method has the benefit of collecting the irregularly shaped fibers 116 with a generally spiral orientation in the wool pack 48. The irregularly shaped long glass fiber 116 is representatively shown in FIG. 2 along with its two-dimensional projection shadow 118, which illustrates the irregular shape or rotation along its length.

Figure 3:
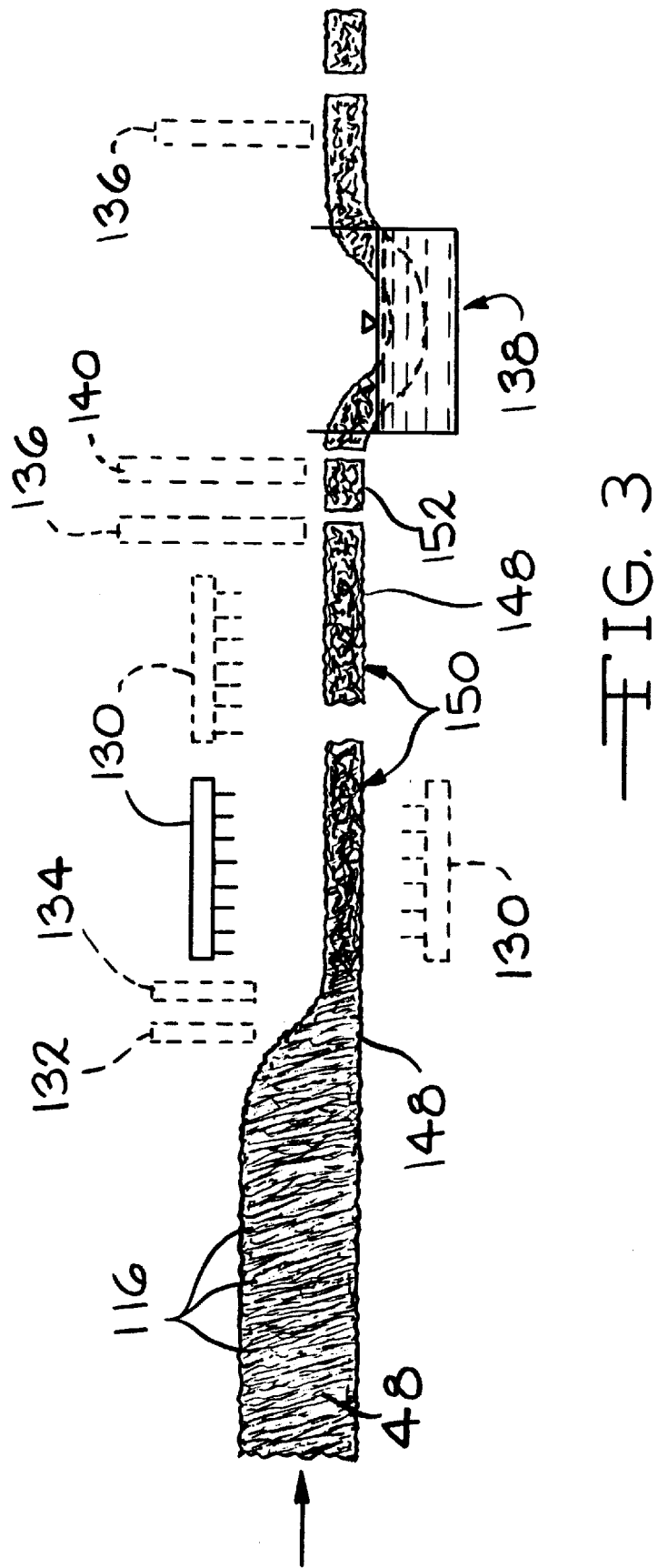
FIG. 3 is a schematic side view of various processing steps performed on a wool pack of irregularly shaped glass fibers in accordance with the present invention.

Referring now to FIG. 3, in accordance with the present invention, the wool portions 148 including irregularly shaped glass fibers 116 may be processed directly without intervening steps which accompany conventional glass fiber processing operations. That is, a wool portion 148 of the irregularly shaped glass fibers 116 may be needled, as generally indicated at 130, without the precursor steps of carding, blending with other fibers, or lubricating, otherwise required with conventional straight glass wools. The openness and resiliency of fibers 116 further allow them to resist abrasion and needling damage by deflection rather than breakage, producing less dust during processing. Nonetheless, the open structure of the irregularly shaped glass fibers 116 improves the ease with which carding and/or blending operations, generally indicated at 132 and 134 respectively, are performed, when such are desired. Such processes are preferably performed before needling, but could also follow needling 130.

Further, irregularly shaped glass fibers 116 produced in accordance with the present invention have a more uniform weight distribution, so that non-woven materials produced by needling or other processing exhibit more uniform properties. As a result, a series of articles including irregularly shaped glass fibers 116 are illustratively disclosed herein in FIGS. 3–12 which may be produced at lower cost, or processed with less effort, with varied and improved product performance characteristics.

Accordingly, the present invention provides a method for producing non-woven material 150 from irregularly shaped glass fibers 116 including the steps of providing a portion 148 of irregularly shaped glass fiber wool, needling the irregularly shaped glass fiber wool, thereby producing a non-woven material 150 substantially comprised of irregularly shaped glass fibers 116. Preferably, the method is performed with irregularly shaped, bi-component glass fibers produced by rotary fiberization, and requires no precursor processing such as carding or blending.

The present invention, thus, provides for a non-woven material 150 comprised of an uncarded, needled glass fiber wool including irregularly shaped glass fibers 116, preferably bi-component glass fibers unblended with other fibers. Non-woven materials 150 including needled, irregularly shaped glass fibers in accordance with the present invention demonstrate not only the high temperature and chemical resistance of glass, but resiliency, high loft, resistance to tear, and a soft felt-like feel (i.e. soft "hand"). The choice of needles, penetrations per square centimeter of material, line speed, vertical displacement of the needles, repetitive needling and needling from one or both sides, as representatively indicated in phantom at 130, can vary these characteristics, making numerous product applications possible.

As may be understood, elimination of carding 132 and/or blending steps 134 makes possible lower cost production of non-woven material which, further, exhibits beneficial characteristics of the irregular glass fibers 116 of the present invention in a resilient felt-like material. Due to the nature of the fiberizing and collection techniques incorporated by reference above, the needling 130 or other processes can proceed directly upon the wool pack 48 after production. Simply stated, a non-woven fabric material 150 may be produced in sheets 152 by a cutting or stamping process, indicated representatively at 136, as shown in FIG. 3.

Further processing in the way of applying a coating, saturant, or filler is representatively indicated at 138, and may include, as necessary for a particular coating, saturant or filler, or other surface treatment to include multiple steps such as heating, drying, or rinsing.

Figure 4:
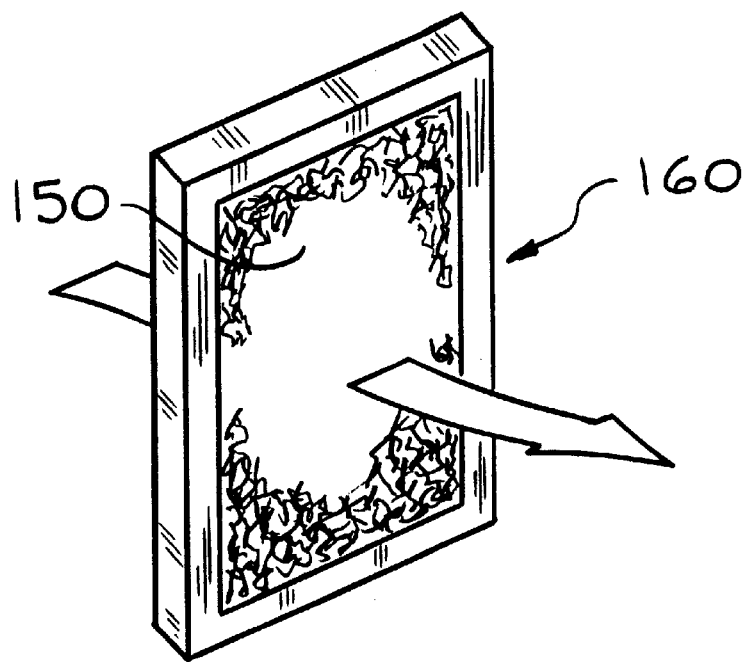
FIG. 4 is a schematic perspective view of a filtration element including needled irregularly shaped glass fibers embodied in a representative panel configuration.
Figure 5:
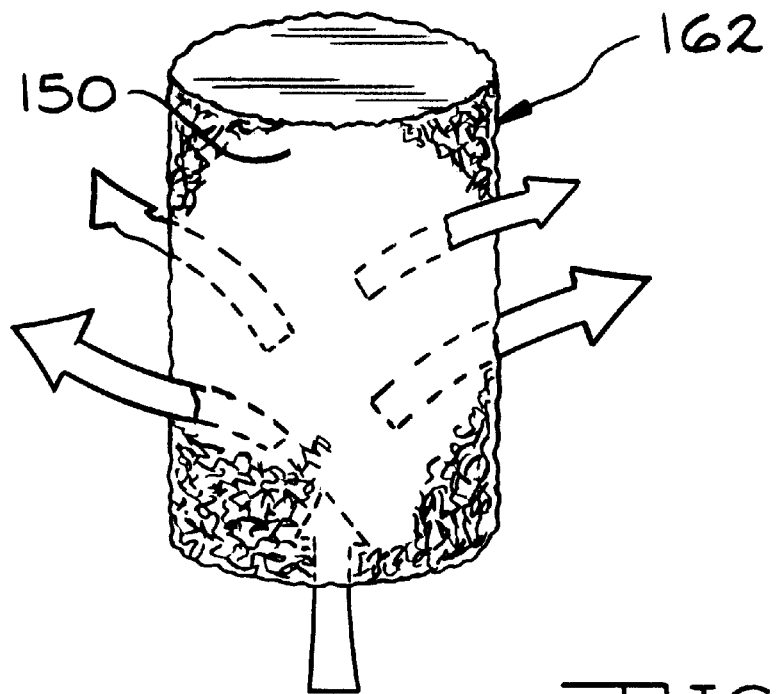
FIG. 5 is a schematic perspective view of a filtration element including needled irregularly shaped glass fibers embodied in a representative filter bag configuration.

Referring to FIGS. 4–7, illustrative product applications are shown. FIGS. 4 and 5 illustrate alternative filtration elements 160, 162 using the non-woven, felt-like material 150 of needled irregularly shaped glass fibers 116. The filtration element is illustratively configured as a panel 160 or a bag 162. Due to the fiber characteristics, filtration elements 160, 162 will exhibit generally uniform filtration characteristics throughout, and are capable of application in high temperature environments. In addition, surface treatments may be added (e.g. at 138) to provide increased surface area, or reaction sites for application-specific chemical species. In addition, sheets 152 of the non-woven material 150 may also serve as a sorbant material without further processing, or include a surface treatment to enhance sorbant properties of the wool portion, or form part of a composite sorbant material. One particular application of interest in this regard is its use as a sorbant for water-borne oil spills.

Figure 6A:
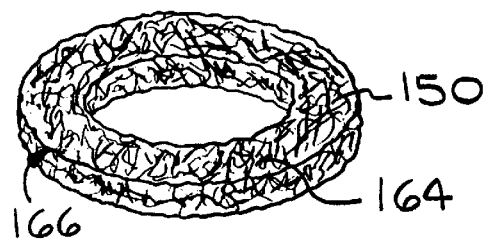
FIG. 6a is a schematic perspective view of a representative gasket including a resilient matrix of needled irregularly shaped glass fibers.
Figure 6B:
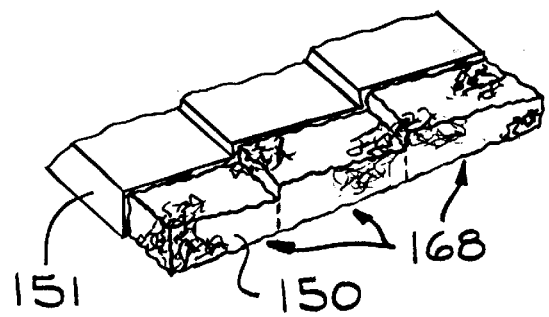
FIG. 6b is a schematic perspective view of a representative shingle including a matrix of irregular glass fibers needled to provide different thicknesses.
Figure 7:
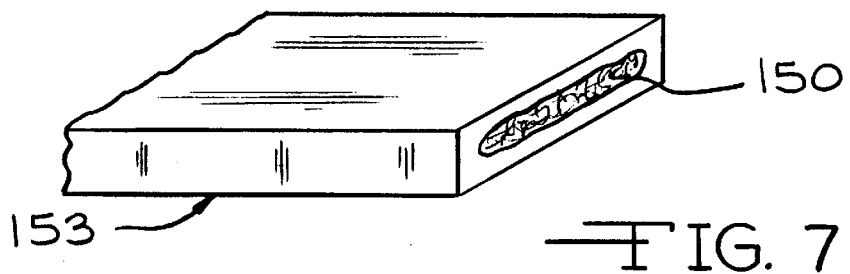
FIG. 7 is a schematic perspective view of a representative structural element having an inner core of irregularly shaped glass fibers.

With or without needling, the irregularly shaped glass fibers 116 in accordance with the present invention may be treated (as indicated generally at 138) with a sorbant or combined with a filler which penetrates into the fiber matrix to produce additional composite products. Referring now to FIG. 6a, a representative gasket 166 is made of a needled unwoven material 150 (as shown) or alternatively of an un-needled wool portion 148 in combination with a saturant 164 such as a closed cell foam. In accordance with the present invention, the resiliency and openness of the irregularly shaped fibers 116 in the needled wool material 150 provides to the combination needed recovery not present in the foam saturant, while the foam saturant 164 provides a sealing capability lacking in the more open fiber structure of the needled material 150. Similarly, in a reinforcements application, needled felts or un-needled wool portions may be used to reinforce a filler material. Needled, unwoven wool material 150 including the irregularly shaped fibers 116 of the present invention may be used, for example, with an asphalt filler 151 for a high loft roofing product. In this regard, needling may be varied across the width of the material so that when cut to form separate shingles 168, areas have different thicknesses, as shown in FIG. 6b. Alternatively, needled or un-needled wool portions 148 may be used, for example, with a polyester or other polymer fillers to provide reinforcement for a substantially rigid composite structural element. As representatively shown in FIG. 7, needled wool materials 150 including the irregularly shaped fibers 116 may form the core of an extruded or pultruded structural element 153.

Figure 8A:
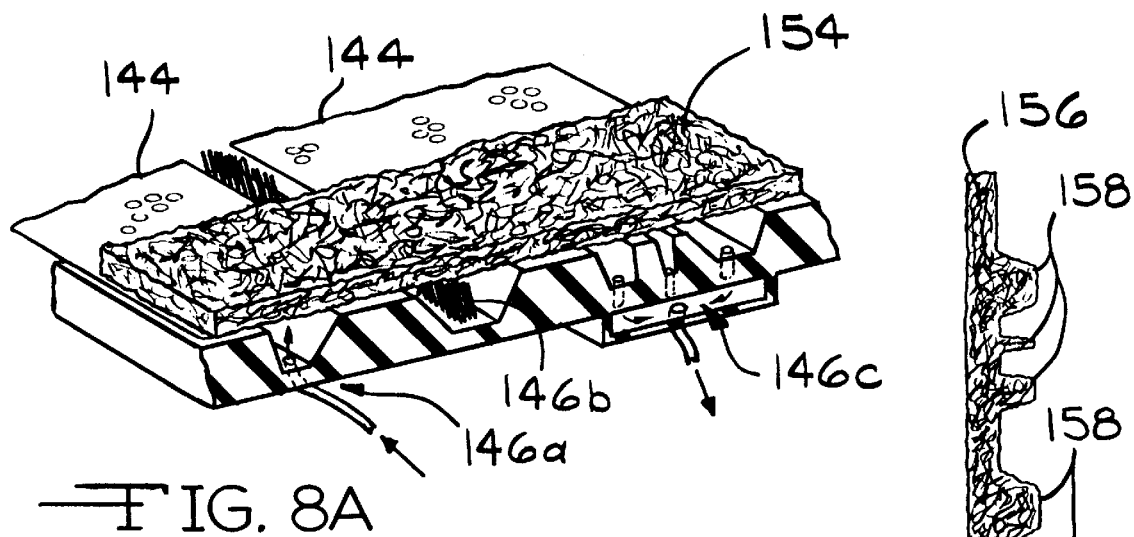
FIG. 8a is a schematic perspective view of representative texturizing process applied to a mat of irregular glass fibers in accordance with the present invention.
Figure 8B:
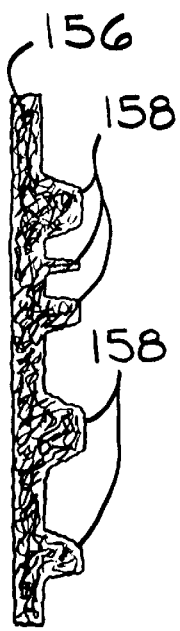
FIG. 8b is a schematic cross sectional view of a texturized mat of irregularly shaped glass fibers
Figure 9:
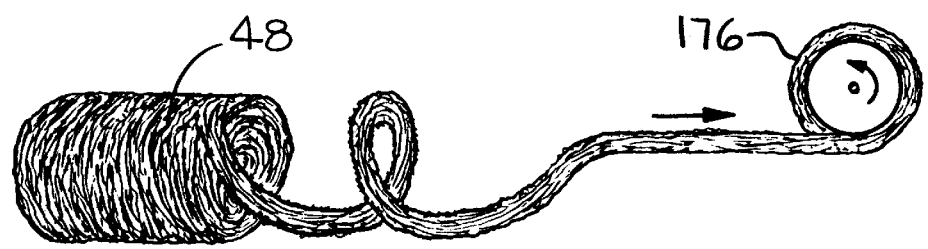
FIG. 9 is a schematic perspective view of a generally continuous tow of irregularly shaped wool fibers being produced from a wool pack collected by direct forming methods.

In addition to needling, carding and blending processes 130, 132, 134, the irregularly shaped fiber 116 of the present invention may be processed by chopping into fiber segments for use, as indicated at 140 in FIG. 3. Such chopping follows rotary fiberization or even may follow needling, to prepare the irregularly shaped fibers 116 for use as a reinforcement. In some applications, the fibers 116 may alternatively be carded or combed to break down the pack structure. Regardless, as in wet lay techniques known for straight fibers, the irregularly shaped fibers 116 may then be wetted, deposited, and dried to form a mat 154 of irregularly shaped fibers 116, as representatively shown in FIG. 8a. Such a mat 154 could be used as a precursor for shingles 168, as well as an underlying matrix for furnishings such as wall coverings, floorings, and ceiling tiles which are fire, smoke or chemical resistant. As shown in FIGS. 8a and 8b, the resiliency and openness of the irregularly shaped glass fiber 116 makes possible texturing the mat structure to provide a variety of looks previously unavailable with conventional fiber substrates.

As shown in FIG. 8a, a conveyor 144, such as a foraminous or split conveyor, may be used to carry the mat over a texturizing station where air jets 146a, brushes 146b, vacuum 146c or other texturizing means causes irregular fibers 116 in the mat surface to release and create a textured line 158. Subsequent application of a coating, saturant or filler (representatively shown in FIG. 3) such as used for ceiling tiles, wall coverings, floorings, shingles or gaskets, will produce a textured product. A representative cross section of the texturized mat 156 is shown in FIG. 8b.

Finally, in a further aspect of the present invention, a non-woven material 150 including irregularly shaped fibers 116 is provided in a generally continuous wool tow 170. The generally continuous tow 170 is produced by "unwinding" a fiberglass wool pack 48 collected by a direct forming method, such as that described in U.S. patent application Ser. No. 08/240,428, incorporated by reference herein. In the direct forming method, irregularly shaped glass fibers 116 are collected such that a generally spiral fiber relationship in the veil of fibers is captured and their spiral orientation is generally maintained in the wool pack 48. As the direct forming method may also be used to collect long straight fibers from a rotary fiberizer, the "unwinding" discussed herein is understood to be capable of performance on batts of such material, albeit with added difficulty in maintaining the continuous tow due to the reduced fiber entanglement. Nonetheless, the generally continuous wool tow 170 may be further processed in numerous ways, and rolled onto a core 176.

The tow 170 may be needled without further processing to create a non-woven fabric strip, or further processed by carding or blending; by cutting, chopping, or stamping; or by addition of a coating, saturant or filler in like fashion as set forth in FIG. 3 and discussed above.

Figure 10:
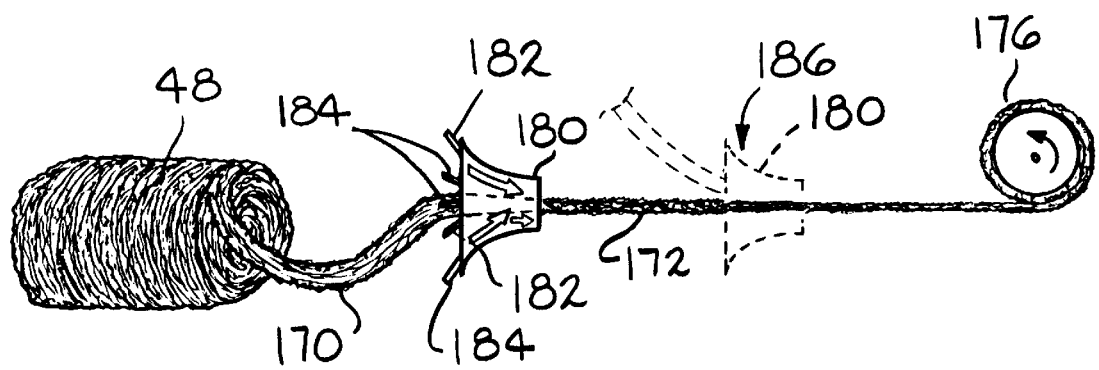
FIG. 10 is a schematic perspective view of a method for making yarn from a generally continuous tow of irregularly shaped wool fibers.

Moreover, the generally continuous wool tow 170 of irregularly shaped fibers 116 may be fed one or more times through an air driven venturi tube 180, shown in FIG. 10. Such a venturi tube 180 has air jets 182 providing an axially aligned air flow, and acts as an air amplifier. Venturi tubes 180 are commercially available, such as Model No. 218 Vortex tube from ITW Vortec Corp., Cincinnati, Ohio. The venturi tube 180 may be used to simply assist in unwinding the tow from a wool pack 48. However, when modified in accordance with the present invention, the venturi tube further includes a plurality of tangentially targeted air jets 184 inducing a spiraling vortex of air. Given the axial air flow component and the spiraling vortex, the venturi tube 180 induces a longitudinal twist in the tow 170 driven therethrough, resulting in a yarn 172. Yarns of varying openness can be made from wool fibers, straight or preferably irregularly shaped, depending on the degree of twist imparted to the tow 170. Alternately, the yarn 172 may be formed by mechanical means, however, air means are preferred for reduced impact on the entanglement of irregularly shaped fibers and the integrity of the tow 170.

In addition, with continued reference to FIG. 10, the yarn 172 thus formed may be further combined (indicated generally at 186) with other yarns of like or different fibers by mechanical twisting means, or by a subsequent pass through the venturi tube 180, to yield combined yarn properties for specific applications. The yarns of irregularly shaped glass fibers, alone or in combination with other fibers, may then be used as carriers or reinforcements, or in additional textile operations including production of woven textiles.

Figure 11:
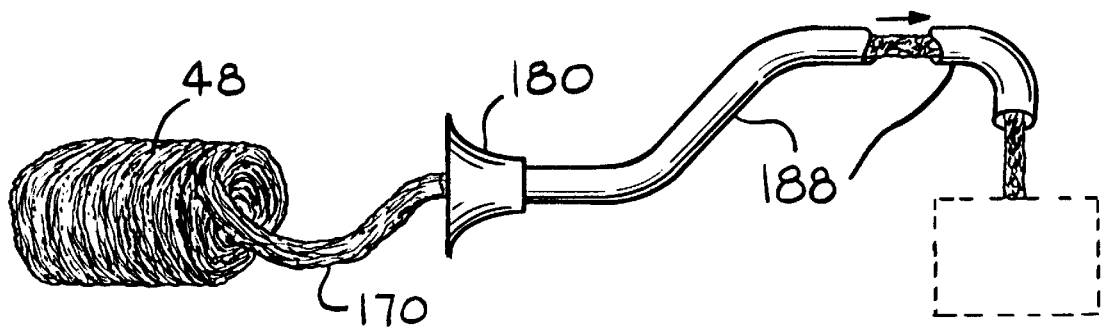
FIG. 11 is a schematic perspective view of a generally continuous tow and a distribution system therefor in accordance with the present invention.
Figure 12:
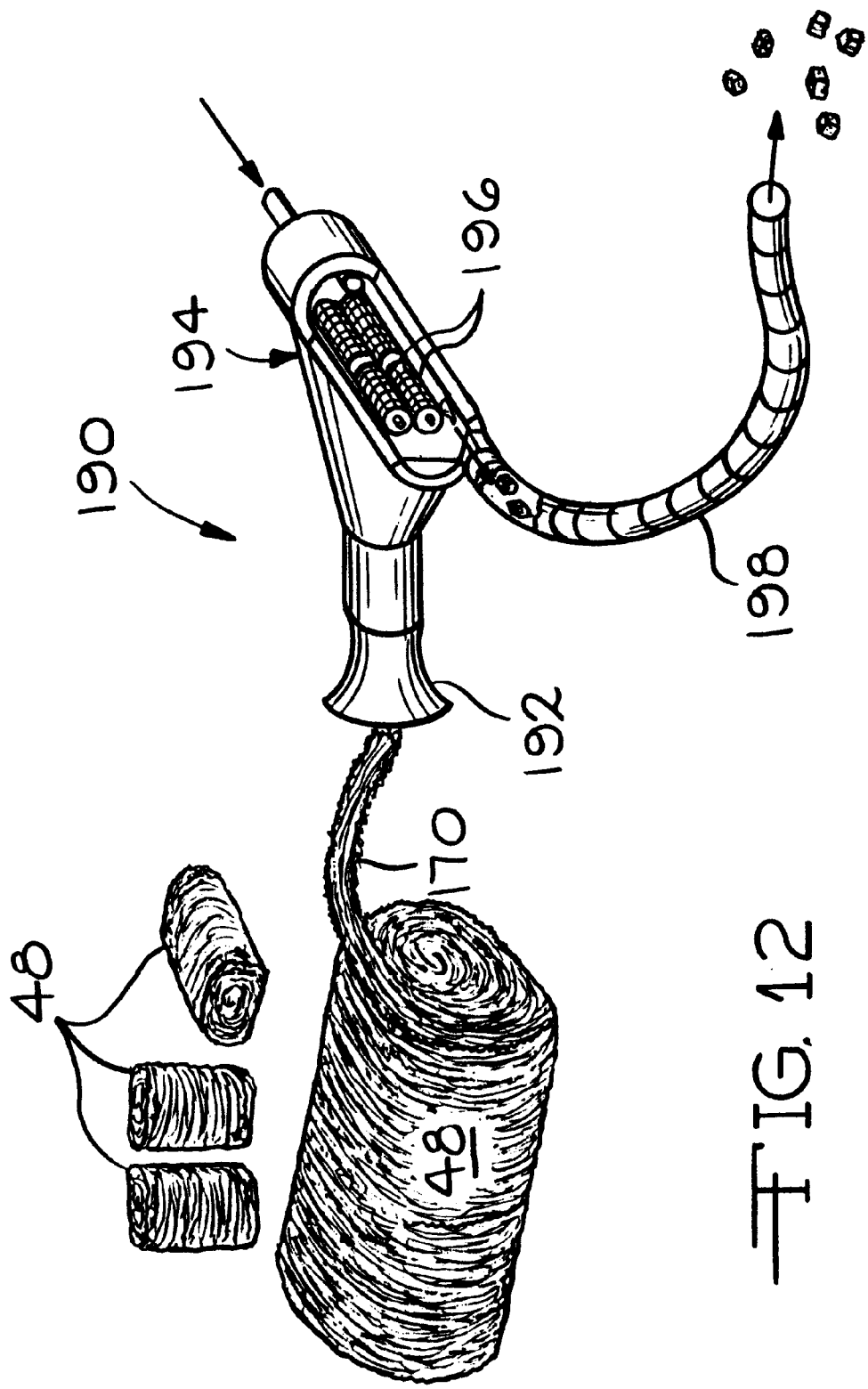
FIG. 12 is a schematic perspective view of a portable blown in insulation system in accordance with the present invention.

Referring now to FIG. 11, in accordance with the present invention, a still further feature of the continuous tow 170 is that the generally continuous tow 170 may be transported between operating stations in a manufacturing facility through transport tubes 188. The tow may be blown or drawn by air movement induced by fans or vacuum or venturi tubes. Thus, from the fiberizing station, wool packs 48 of irregularly shaped fibers 116 collected by direct forming methods as disclosed herein may be "unwound" into a tow 170 and transported for further processing at remote stations without manual intervention, conventional conveyors or other mechanical transport. Preferably the transport pipes 188 are built as overhead systems requiring a minimum of plant floor space.

The production of a generally continuous tow 170 by "unwinding" a fiberglass wool pack 48 collected by a direct forming method may further be applied in providing a portable blowing wool apparatus 190 comprising a wool pack 48 of irregularly shaped glass fibers 116 collected by direct form methods. In accordance with the present invention, a highly compressed wool pack 48 is unpacked on site, and the tow 170 drawn therefrom by means of a standard venturi tube 192. The tow 170 is thereafter passed through a cubing element 194 which cuts the tow 170 into cubes or pieces, which are then preferably blown by compressed air into spaces to be insulated. The cubing element 194 preferably includes two hollow cutting cylinders 196. The cubes are preferably 1.2 to 2.5 cm in any of the width, length or height directions. Once cut, the cubes drop into the center of the cylinders 196 from where they are blown by compressed air from an air compressor (not shown), or alternatively, by a fan or blower, through the duct 198. This portable system allows an installer to take advantage of the high compressibility of the irregularly shaped fiber 116, reduce capital costs of trucks and hoses, and perform a cleaner on-site procedure.

Figure 13:
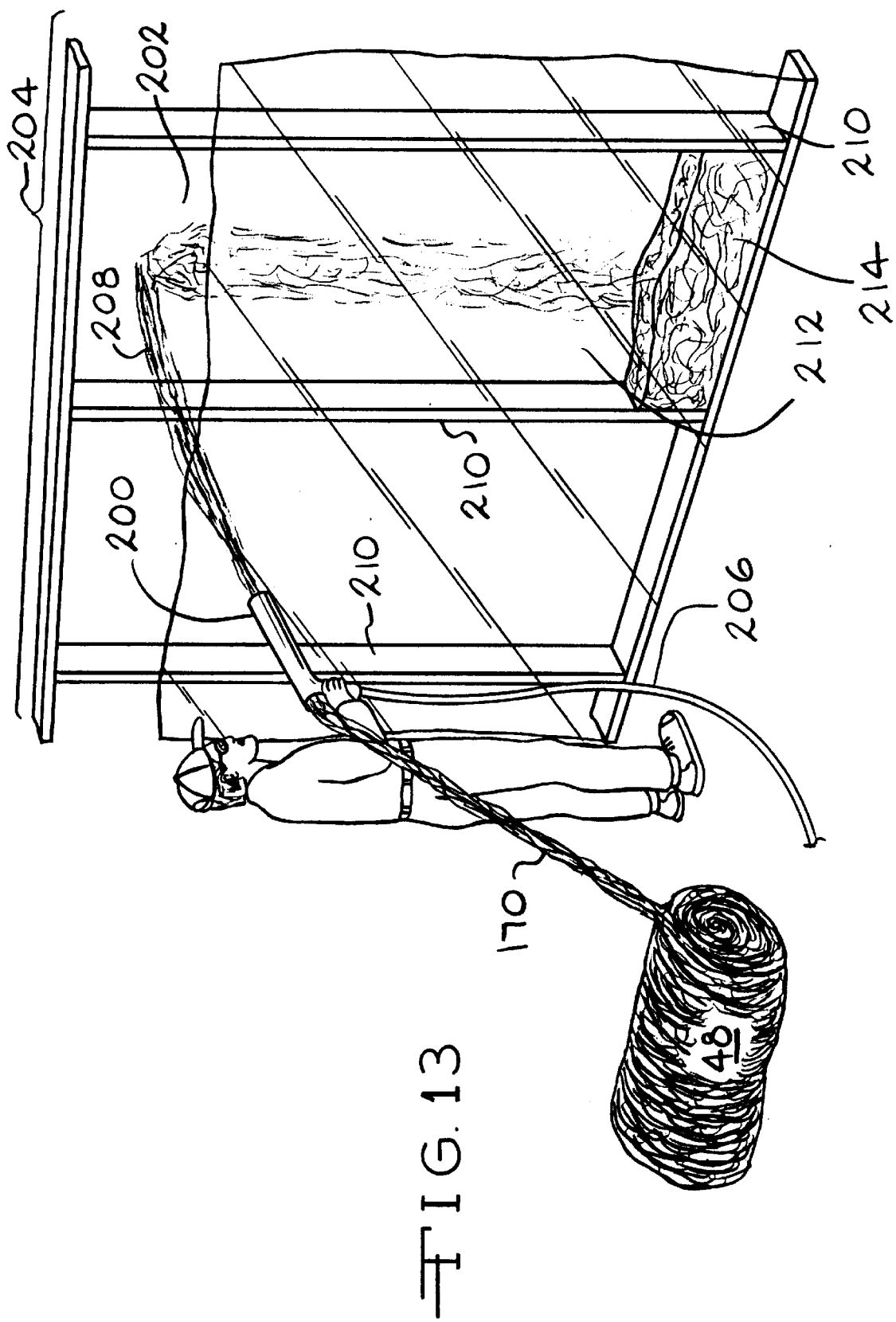
FIG. 13 is a schematic perspective view illustrating the method for introducing a continuous yarn of fibers into a wall cavity of a building.

As shown in FIG. 13, yarn 170 can be continuously withdrawn from a wool pack 48 and fed into a roving gun 200 which propels the yarn toward the wall cavity 202 of a building structure 204. Any device, such as a pneumatic nozzle, suitable for propelling the yarn toward the building structure can be used. A convenient propelling device is a roving gun, which is well known in the lay-up molding industry. Roving guns are usually pneumatically driven, and typically include a rotary cutter mechanism to chop the yarn or strand while dispensing it. Various sizes of roving guns are available, and the optimum size will depend on the rate of propulsion desired and the weight, strength and thickness of the yarn or strand. The roving gun is provided with pressurized air supplied via air supply line 206, connected to a source of pressurized air, not shown. For some applications the roving gun will have a built-in chopper, not shown, to chop the yarn into discrete lengths as the yarn passes through the roving gun. The preferred yarn for use with the invention is bicomponent, irregular glass fibers made from a dual glass composition. The preferred method for manufacturing the pack of irregular fibers is using a rotary process, as described above.

The insulation installer can direct the chopped yarn, in the form of loosefil insulation 208, in a manner known in the art to insulate the cavities 202 of the building structure 204. Typical building structures include wall studs 210 over which a plastic vapor barrier 212 is attached. The loosefil insulation 208 is directed through small openings, not shown, in the plastic vapor barrier, or over the top of the plastic vapor barrier, as shown. The loosefil insulation accumulates as an insulation body or product 214 in the wall cavity. In addition to insulating cavities in buildings, the method of the invention can be used with an open molding technique to insulate many other kinds of structures, such as vehicles, industrial equipment and appliances.

There are several advantages in using the method of the invention for producing insulation products. In contrast to the bulky and cumbersome conventionally used equipment for installing blowing wool or loosefil insulation in buildings, the paying out of yarn and propelling it with a roving gun or a similar applicator device allows easy freedom of movement for the installer, a quicker setup and knockdown time for the equipment, and more precise control in directing the loosefil insulation. Also, other materials can be applied to the fibrous material as it is dispensed. Examples include antistatic material, fire retardants, and lubricants.

Figure 14:
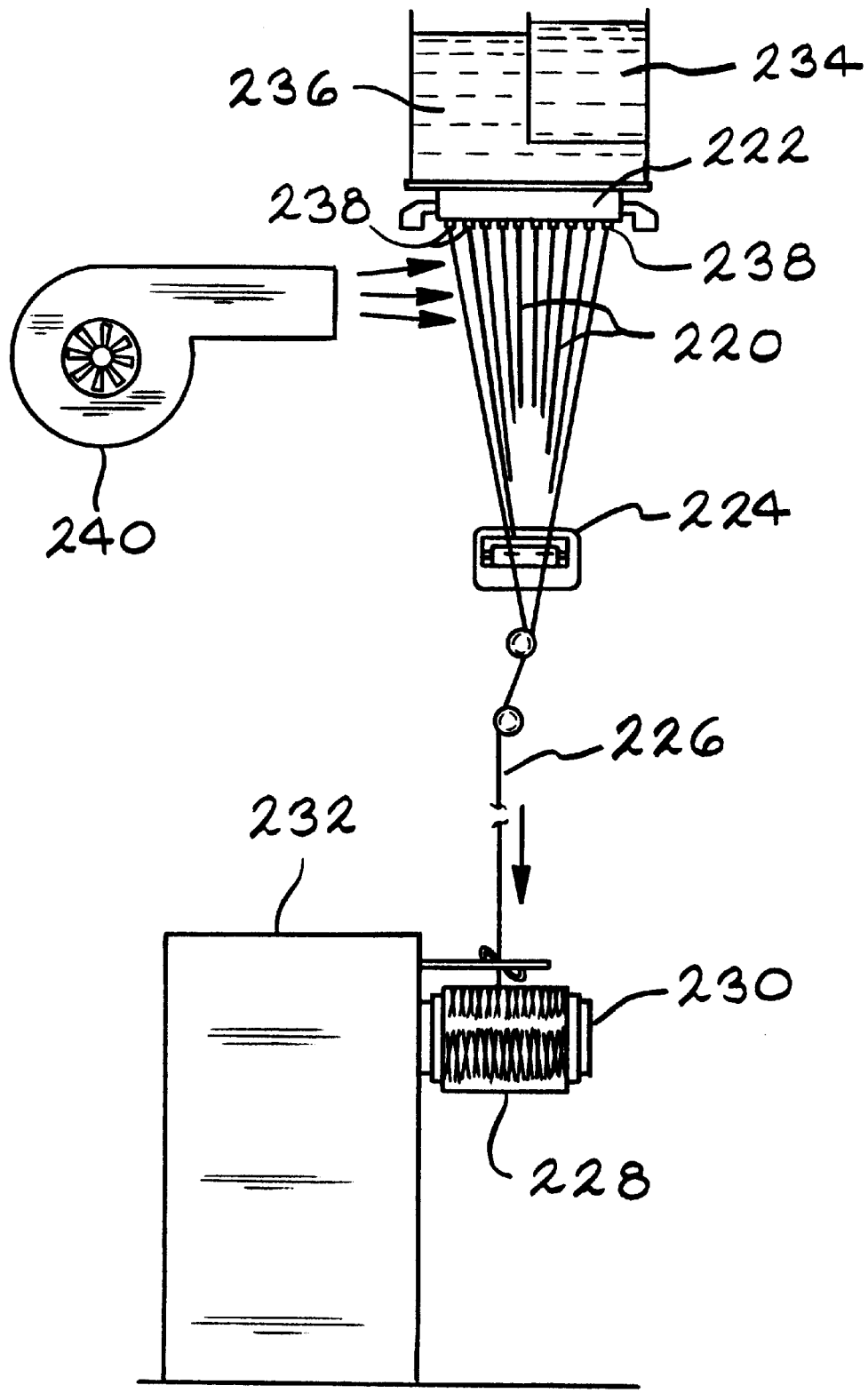
FIG. 14 is a schematic view in elevation of drawing irregular fibers from a bushing and collecting them as a strand in a wound package.

In an alternate embodiment, as shown in FIG. 14, irregular glass fibers are drawn as filaments 220 from bushing 222. The filaments 220 can be contacted by size applicator 224 which applies a coating on the filaments for protection from abrasion and for enhanced compatibility with a resin matrix to be reinforced. The filaments are gathered into a strand 226 and wound as a package 228 on rotating collet 230 of winder 232.

The irregular fibers are preferably dual glass fibers produced from two different glasses 234 and 236, having different coefficients of thermal conductivity. Each of the bushing tips 238 is connected to both bodies of glass 234 and glass 236 so that a dual glass fiber is formed, as is known in the prior art. The differences in coefficients of thermal expansion will provide an inherent curliness in the fibers. Additionally, a turbulence generator, such as a fan 240, can be used to provide enough turbulence to impart random forces on the fibers as they are being formed, thereby producing irregular dual glass fibers.

Figure 15:
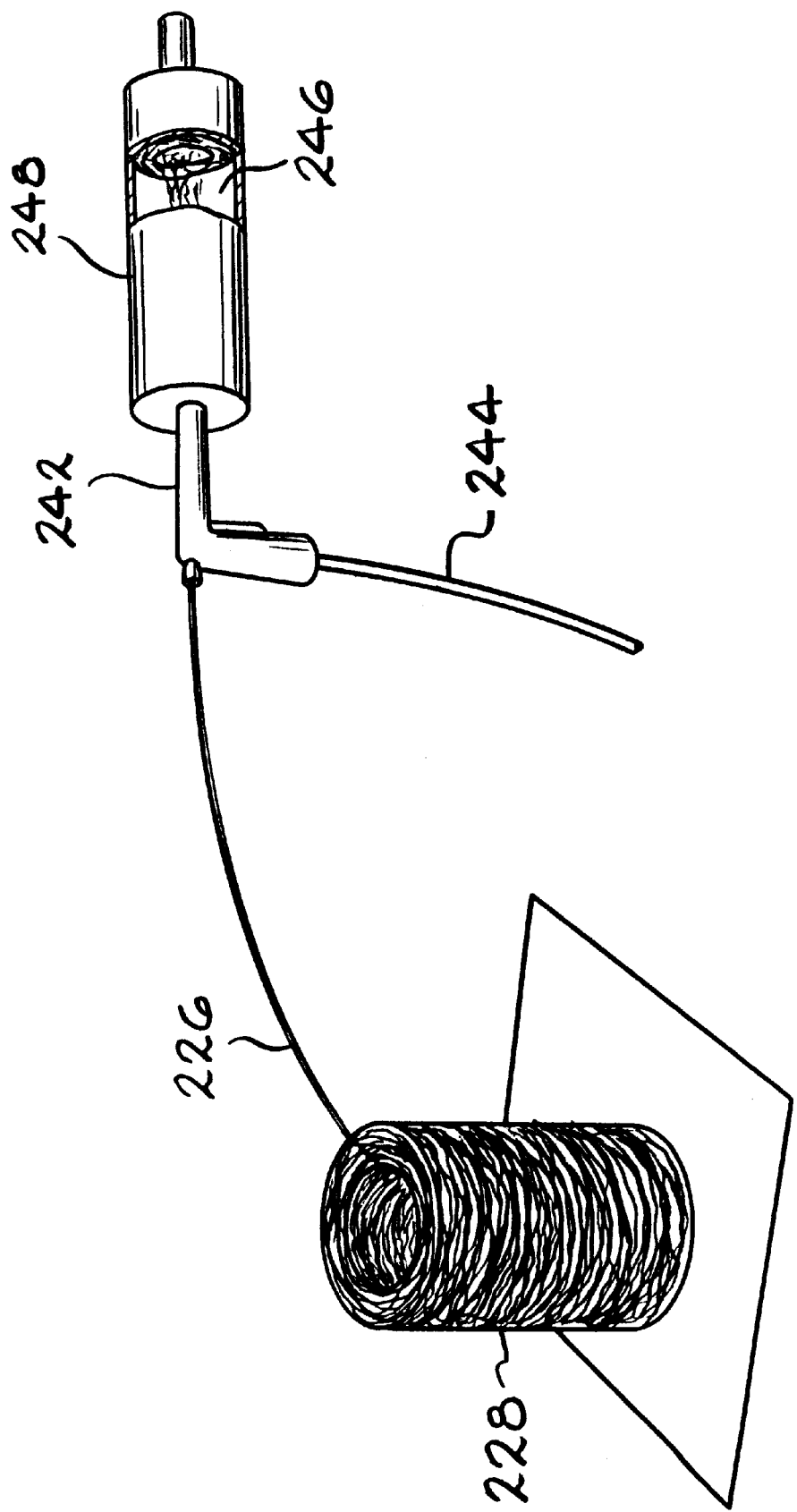
FIG. 15 is a schematic view in perspective of a process for continuously withdrawing a strand from the package and directing it into the cavity of a muffler.

Once the strands of irregular fibers are formed into a package, they can be payed out as shown in FIG. 15. The strand can be propelled by any suitable means such as a pneumatic nozzle 242. The air nozzle is supplied with air via air line 244 for a source of pressurized air, not shown, to drive the strand through the nozzle. The nozzle can be provided with a chopper, not shown, to cut the strand into discrete lengths. The nozzle can be arranged to direct the strand into an appropriate receptacle, such as the cavity 246 of a muffler 248. This application of irregular fibers provides acoustic insulation. Alternatively, the nozzle can be arranged to propel the strand into other types of receptacles, including transportation vehicles, such as airplanes and automobiles, and also including appliances such as kitchen ranges and dishwashers. Additionally, the irregular fibers can be propelled into receptacles for forming industrial insulation products, such as automobile headliner and pipe insulation products. Further, the insulation product may be primarily structural in nature, with the insulation quality being of secondary importance, such as in a window lineal or a compressed fiber building stud.

In a particular embodiment of the invention, the irregular fibers of the yarn (formed by pulling a yarn from a wool pack) or of the strand (pulled from a textile bushing) can be treated with a coating or finish designed to reduce the bulkiness of the yarn or strand during the packaging and transportation stages. The finish can be applied to the irregular fibers in a rotary process with a liquid spray, not shown, or applied to the yarn in a post forming operation by running the yarn through a coating bath. In a textile process the finish can be applied to the strand by the applicator 224. The nozzle or roving gun can be provided with a mechanism for impinging upon or breaking the finish on the irregular fibers, thereby degrading the finish. This degrading of the finish will release control of the finish over the irregular fibers, thereby enabling the yarn or strand to increase in bulkiness.

Having described the invention in detail and by reference to the preferred embodiments thereof, it will be apparent that modifications and variations are possible without departing from the scope of the invention which is defined in the appended claims.

INDUSTRIAL APPLICABILITY

The invention can be useful producing insulation products such as insulation for wall cavities in buildings and insulation in appliances such as kitchen ranges and automobile mufflers.

I claim:

1. A method for forming an insulation product comprising providing irregularly shaped fibers as a pack, continuously withdrawing a portion of the fibers from the pack to generate a continuous yarn of fibers, and propelling the yarn toward a receptacle to form an insulation product.

2. The method of claim 1 in which the yarn is propelled by running it through a pneumatic nozzle.

3. The method of claim 2 comprising chopping the yarn as it is propelled through the nozzle.

4. The method of claim 1 in which the pack of irregularly shaped fibers is provided by centrifuging fibers using a rotary process and collecting the fibers as a pack.

5. The method of claim 1 in which the receptacle is a cavity in a building, and yarn is propelled into the cavity.

6. The method of claim 1 in which the receptacle is a cavity in an appliance, and the yarn is propelled into the cavity.

7. The method of claim 1 in which the irregularly shaped fibers in the pack have a finish applied to them to reduce the bulkiness of the pack, and in which the propelling step degrades the effect of the finish, thereby increasing the bulkiness of the irregularly shaped fibers.

8. The method of claim 1 in which the pack of irregularly shaped fibers is provided by centrifuging fibers using a rotary process and collecting the fibers as a pack, and in which the yarn is propelled by running it through a pneumatic nozzle and the yarn is chopped as it is propelled through the nozzle, where the receptacle is a cavity in a building, and the yarn is propelled into the cavity.

9. A method for forming an insulation product comprising centrifuging irregularly shaped glass fibers using a rotary process, collecting the fibers as a pack, continuously withdrawing a portion of the fibers from the pack to generate a continuous yarn of fibers, and propelling the yarn toward a receptacle to form an insulation product.

10. The method of claim 9 in which the yarn is propelled by running it through a pneumatic nozzle and chopping the yarn as it is propelled through the nozzle.

11. The method of claim 10 in which the receptacle is a cavity in a building, and the yarn is propelled into the cavity.

12. The method of claim 10 in which the receptacle is a cavity in an appliance, and the yarn is propelled into the cavity.

13. A method for forming an insulation product comprising providing irregularly shaped fibers as a wound package, continuously withdrawing a strand from the package, and propelling the strand toward a receptacle to form an insulation product.

14. The method of claim 13 in which the strand is propelled by running it through a pneumatic nozzle.

15. The method of claim 14 comprising chopping the strand as it is propelled through the nozzle.

16. The method of claim 13 in which the wound package of irregularly shaped fibers is provided by drawing the fibers from a bushing, and collecting the strand as a wound package.

17. The method of claim 13 in which the receptacle is a cavity in a building, and the strand is propelled into the cavity.

18. The method of claim 13 in which the receptacle is a cavity in an appliance, and the strand is propelled into the cavity.

19. The method of claim 13 in which the irregularly shaped fibers in the pack have a finish applied to them to reduce the bulkiness of the pack, and in which the propelling step degrades the effect of the finish, thereby increasing the bulkiness of the irregularly shaped fibers.

20. The method of claim 13 in which the wound package of irregularly shaped fibers is provided by drawing irregularly shaped glass fibers from a bushing containing molten glass, and collecting the strand as a wound package, and in which the strand is propelled by running it through a pneumatic nozzle, and chopped as it is propelled through the nozzle.

* * * * *